United States Patent
Lee et al.

(10) Patent No.: US 10,110,806 B2
(45) Date of Patent: Oct. 23, 2018

(54) ELECTRONIC DEVICE AND METHOD FOR OPERATING THE SAME

(71) Applicant: Samsung Electronics Co., Ltd., Suwon-si, Gyeonggi-do (KR)

(72) Inventors: Yongman Lee, Seongnam-si (KR); Kwangyoung Kim, Suwon-si (KR); Sungdae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 14/256,585

(22) Filed: Apr. 18, 2014

(65) Prior Publication Data

US 2014/0313360 A1  Oct. 23, 2014

(30) Foreign Application Priority Data

Apr. 19, 2013 (KR) .......... 10-2013-0043851

(51) Int. Cl.
*H04N 5/225* (2006.01)
*H04N 5/232* (2006.01)

(52) U.S. Cl.
CPC .............. *H04N 5/23229* (2013.01)

(58) Field of Classification Search
CPC .......... G03B 2206/00; G03B 2206/002; G08B 13/19671; H04N 1/2125; H04N 1/2112; H04N 1/2116; G06F 17/30268; G06F 17/30817; G06F 17/3082
USPC ......................................... 348/231.99–231.9
See application file for complete search history.

(56) References Cited

U.S. PATENT DOCUMENTS

| | | | | |
|---|---|---|---|---|
| 2008/0239093 A1* | 10/2008 | Easwar | ................... | G06T 9/007 348/222.1 |
| 2010/0220215 A1* | 9/2010 | Rubinstein | .......... | G06F 15/8015 348/231.99 |
| 2012/0081577 A1* | 4/2012 | Cote | ...................... | H04N 19/80 348/231.99 |

* cited by examiner

*Primary Examiner* — Twyler Lamb Haskins
*Assistant Examiner* — Dwight Alex C Tejano
(74) *Attorney, Agent, or Firm* — Jefferson IP Law, LLP

(57) ABSTRACT

A method for processing image captured by an image sensor is provided. The operation method of an electronic device according to the present disclosure includes receiving a sensing image having a sensor pattern of an image sensor and meta-information including sensing image information related to the sensing image and storing the sensing image and the sensing image information including the meta-information.

14 Claims, 10 Drawing Sheets

ELECTRONIC DEVICE AND METHOD FOR OPERATING THE SAME

CROSS-REFERENCE TO RELATED APPLICATION(S)

This application claims the benefit under 35 U.S.C. § 119(a) of a Korean patent application filed on Apr. 19, 2013 in the Korean Intellectual Property Office and assigned Serial number 10-2013-0043851, the entire disclosure of which is hereby incorporated by reference.

TECHNICAL FIELD

The present disclosure relates to image processing. More particularly, the present disclosure relates to a method for processing image captured by an image sensor.

BACKGROUND

Electronic devices having communication functions and that are easily portable are increasingly popular. The electronic devices are advancing at a rapid pace in line with the development of hardware and software technologies capable of providing various contents, particularly collecting and processing images.

Accordingly, an electronic device and method for operating the electronic device that are capable of storing and processing images efficiently is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for operating the electronic device that are capable of storing and processing images efficiently.

In accordance with an aspect of the present disclosure, an operation method of an electronic device is provided. The operation method includes receiving a sensing image having a sensor pattern of an image sensor and meta-information including sensing image information related to the sensing image and storing the sensing image and the sensing image information including the meta-information.

In accordance with another aspect of the present disclosure, an operation method of an electronic device is provided. The operation method includes detecting an event selecting a sensor information image including a sensing image having a sensor pattern of an image sensor and meta-information including information related to the sensing image, generating an output-mapping image to be output to a display unit based on the mapping information which maps the sensor pattern of the image sensor to a pattern of the display unit according to the selection event and the meta-information, and displaying the generated output-mapping image on the display unit.

In accordance with still another aspect of the present disclosure, an electronic device is provided. The electronic device includes an image sensor configured to capture a sensing image, at least one of an input unit and a display unit which generates an input event for capturing the sensing image, a control unit configured to store a first type image having a format identical with that of a sensor pattern of the image sensor and a second type image having a format different from that of the sensor pattern of the image sensor, and a storage configured to store a composite image including a header containing property information defining the first and second type images, the first type image, and the second type image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
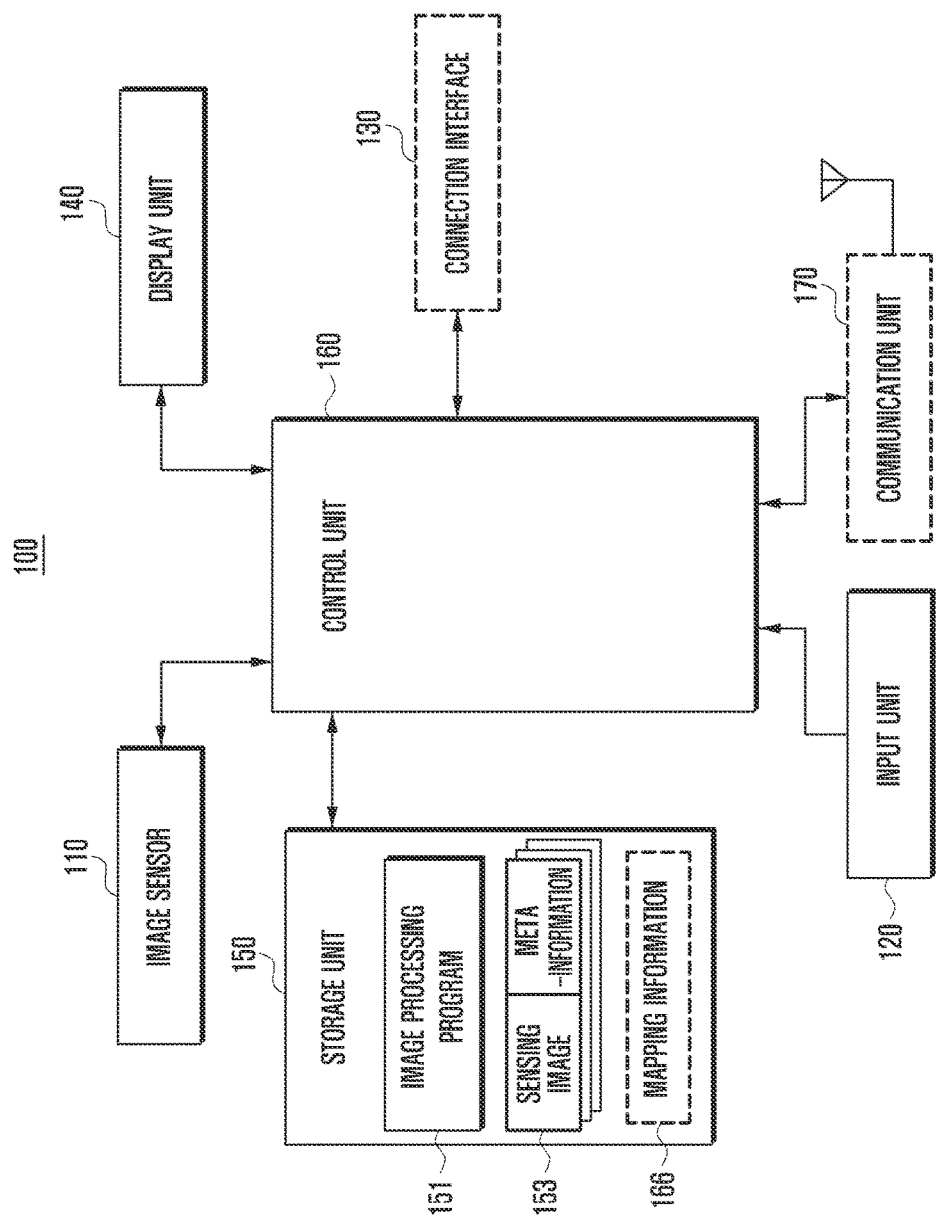
FIG. 1 is a block diagram illustrating an electronic device, e.g. terminal, supporting image processing according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those shown in drawings, in practice. The same reference numbers are used throughout the drawings to refer to the same or like parts.

FIG. 1 is a block diagram illustrating an electronic device, e.g. terminal, supporting image processing according to an embodiment of the present disclosure.

As shown in FIG. 1, the terminal 100 of the present disclosure includes an image sensor 110, an input unit 120, a display unit 140, a storage unit 150, and a control unit 160, but is not limited thereto. The display unit 140 may be configured as an output device for outputting image generated in the electronic device. The terminal 100 also may include a communication unit 170 having at least one communication module supporting at least one of a short range communication function and a cellular communication function. The terminal 100 may further include a connection interface 130 supporting connection of an external display device. The terminal 100 may further includes an audio processing unit for outputting communicated audio signal, stored audio signal, and collected audio signal.

The above-structured terminal 100 may store the shooting condition information of the image sensor 110 as meta-information together in the process of storing the image captured by the image sensor 110. If the terminal 100 is received an image selection signal, the terminal 100 generates and displays an output mapping image based on the meta-information and the mapping information. For example, the mapping information is corresponding to pixel type or image type, and the pixel type or image type is determined depending on the hardware configuration of the display unit 140, e.g. the pixel type or image type corresponds to Bayer pattern. The terminal 100 is capable of generating the output-mapping image from the sensing image (e.g., Raw Image) using the mapping information and the meta-information without extra decoding process in the stored sensing image information output procedure. For example, the terminal 100 may convert the Red, Green, and Blue (RGB) type sensing image provided by the image sensor 110 into the same RGB type output mapping image. Accordingly, the terminal 100 is capable of simplifying the image output function by negating the decoding process required in the image output procedure.

The image sensor 110 is capable of acquiring images of various resolutions according to the hardware characteristics. For example, if the image sensor 110 acquired an image of resolution of 8 Mega Pixel (MP), the terminal 100 may store the 8 MP resolution sensing image and the sensing image information 153 including the meta-information in the storage unit 150. If the terminal 100 is received a request for displaying the image corresponding to the stored high resolution (e.g., 8 MP) sensing image, the control unit 160 adjusts the scale of the image to generate an output-mapping image, e.g. 4 MP resolution image. In this procedure, the control unit 160 performs image conversion based on the predefined mapping information to be used for converting from the sensing image of high resolution into a proper output-mapping image and the meta-information corresponding to the shooting condition information at the time. The mapping information may be formed in various types according to the resolution or hardware characteristics of the display unit 140.

The image sensor 110 is a device for acquiring and capturing images. For example, the image sensor 110 may be arranged in the form of a matrix of a plurality of semiconductor devices. The resolution of the image sensor 110 may be determined by the integration degree of a plurality of semiconductor devices arranged in the form of a matrix. The image sensor 110 applied to the terminal 100 may be the device capable of acquiring and capturing the image of high resolution as compared to the image displayed by the display unit 140. The image sensor 110 may include a lens module, a housing containing the lens module, and an optical conversion circuit for converting the light input through the lens module to a predetermined type of data. The image sensor 110 may provide the control unit 160 with a specific type of image such as RGB Bayer pattern image. The image sensor 110 also may provide the control unit 160 a Red, Green, Blue, and White (RGBW) Bayer pattern image of a subject. In the following, the description is directed to the image processing function in association with RGB type.

The input unit 120 is a component of generating various input signals related to the operation of the terminal 100. The input unit 120 may include at least one of hardware key or physical key on one side of the terminal 100. The input unit 120 may generate a turn-on/off signal, image sensor activation signal, and image capture signal. At least one of the physical keys of the input unit 120 may be designed as a hot key to directly activate the image sensor.

The input unit 120 may generates optical condition adjustment signals of the image sensor 110 in response to the control of the user. The optical condition adjustment signals may include the signal for adjusting at least one environmental condition of the image sensor 110. For example, the optical condition adjustment signals may include a distance adjustment signal, e.g. digital zoom-in/out, flash-on/off signal, image effect adjustment signal, shutter speed adjustment signal, International Organization for Standardization (ISO) adjustment signal or burst shot adjustment signal, and the like. The generated input signal from the input unit 120 is transferred to the control unit 160. The display unit 140 is implemented as an input means such as touchscreen, it may be considered as a part of the input unit 120 in view of generating the input signal. The touchscreen-enabled display unit 140 is capable of generating the aforementioned input signals to the control unit 160 in response to the touch gesture made thereon.

If an external display device is connected through the connection interface 130, the input unit 120 may generates a specific mapping information selection signal for supporting the external display device. If the external display device is connected through the connection interface 130, the control unit 160 checks the type of the external display device and automatically selects the optimal mapping information according to the type of the external display device. If the control unit 160 is not able to automatically select the optimal mapping information according to the certain external display device, the control unit 160 may provide the external display device with a screen prompting to select mapping information for providing the external display device with the external output-mapping image. The user may select specific mapping information manually using the input unit 120 or input function of the display unit 140.

The connection interface 130 may be the device supporting connection of an external display device. For example, the connection interface 130 may include a wire connection interface for cable connection with an external display device. The connection interface 130 may include a wireless communication interface capable of allowing wireless data communication with the external device. The connection interface 130 may be implemented with short range wireless communication modules as well as the serial interface such as Universal Serial Bus (USB) and Universal Asynchronous Receiver/Transmitter (UART). If an external display device is connected through the connection interface 130, the connection interface 130 generates a signal to the control unit 160 in association with the connection of the external display device.

The terminal 100 may support an external display device through the connection interface 130. The terminal 100 may output the output-mapping image generated based on the sensing image information 153 stored in the storage unit 150 to the external display device as well as the display unit 140. For example, the terminal 100 may output the output-mapping image generated based on the sensing image information 153 to at least one of the display unit 140 and the external display device.

The terminal 100 checks the display characteristics of the external display device and selects the mapping information corresponding to the external display device. The terminal 100 is capable of generating external output-mapping image from the sensing image based on the selected mapping information and the meta-information of the sensing image information 153. The terminal 100 may output the generated external output-mapping image to the external display device. The terminal uses the mapping information optimized for the external display device among the various mapping information in output the sensing image information 153 stored in the storage unit 150.

The external display device may be the device capable of being connected to the terminal 100 through the connection interface 130. The external device may establish at least one of wired and wireless communication channel with the terminal 100. The external display device may provide the external display device ID and/or Bayer pattern information to the terminal through the connection interface 130. The external display device may receive the external output-mapping image optimized according to the information it has provided and display the external output-mapping image. Examples of the external display device include Television (TV) monitor, smart TV, tablet Personal Computer (PC), slate PC, panel-type or laptop PC, and other electronic device equipped with a display panel.

The display unit 140 may output various screens associated with the operations of the terminal 100. For example, the display unit 140 may display a menu screen, a widget screen, an icon screen, a standby screen, a gallery screen, a web connection screen, and the like. The display unit 140 may also display the screen including an icon or menu item for activating the image sensor 110. In response to the request for selecting the stored image, the display unit 140 may display the output-mapping image corresponding to the sensing image information 153 stored in the storage unit 150. At this time, the output-mapping image outputted to the display unit 140 may be the image acquired by adjusting the scale of the sensing image stored in the storage unit 150 based on the meta-information of the output-mapping image and the mapping information.

In the case that the terminal 100 supports a portability function, the display unit 140 may be restricted in resolution to a predetermined size. The resolution of the display unit 140 of the terminal 100 is determined depending on the display size and hardware integration technology. For example, the display unit 140 may support at least one of the resolutions of 960×640, 1280×800, 800×480. The high resolution sensing image captured by the image sensor 110 may be adjusted in scale for being output to the display unit 140. For example, the sensing image may be displayed in the up-scaled format or down-scaled format.

The display unit 140 may be implemented in one of various types. For example, the display unit 140 may be one of Liquid Crystal Display (LCD) device, Active Matrix Organic Light Emitting Diodes (AMOLED) device, carbon-nanotube-based display device, and plasma panel display device. For example, the display unit 140 may be implemented in one of RGBW color filter type, RGBW AMOLED type, RGB LCD type, and RGB AMOLED type.

If the image sensor 110 is activated, the display unit 140 may output a control screen prompting to configure shooting conditions of the image sensor 110. The display unit 140 may output the output-mapping image generated by applying the first mapping information to the sensing image captured by the image sensor 110. At this time, the first mapping information may be of converting the sensing image stored in the storage unit 150 to be fit for the Bayer pattern of the display unit. If an external display device is connected through the connection interface 130, the display unit 140 may turns off automatically. The display unit 140 may maintain the turn-on state or turns off independently of the connection of the external display device according to the schedule information or under the user control.

The storage unit 150 may store various data and programs associated with the operations of the terminal 100. For example, the storage unit 150 may store at least one Operating System (OS) for operation of the terminal 100. The storage unit 150 may include various programs for supporting functions of the terminal 100, e.g. browser application, music player application, video playback application, broadcast reception function application, and black box function application, video chat application, and video call application. The storage unit 150 may store the sensing image information 153 captured by the image sensor 110. The storage unit 150 may store the mapping information 166 for generating output mapping information.

The image processing program 151 may include a storage routine, a generation routine, and an output routine. These routines may be loaded onto the control unit 160 to operate as the components of pre-processor, mapper, and post-processor. The storage routine may include subroutines for storing the sensing image captured by the image sensor 110 as the sensing image information 153. The generation routine may include subroutines for generating output-mapping images based on the stored sensing image information 153. The output routine may include the subroutines for outputting the generated output-mapping image to the output device.

The storage routine may include the subroutine of capturing the sensing image of a subject according to an input signal by means of the image sensor 110 and the subroutine of storing the captured sensing image as a raw image. The storage routing also may include the sub-routing of collecting the shooting condition information of the image sensor 110 in capturing the image as the meta-information and the subroutine of storing the meta-information and the sensing image in the form of the sensing image information 153. The shooting condition information may include at least one of hardware characteristic information of the image sensor 110, shooting brightness information, ISO information, zoom information, flash setting information, image effect information, shutter speed information.

The generation routine may include the subroutine of checking the meta-information of the sensing image information 153 and the subroutine of checking the mapping information corresponding to the display device characteristic of the output device, e.g. Bayer pattern information. The creation routine may include the subroutine of generating the output-mapping image from the sensing image based on the meta-information and the mapping information. The output-mapping image generated in this way may be the image acquired by scaling the sensing image depending on the display device of the output device, e.g. up-scaled or down-scaled image. The output-mapping image also may be the image acquired by applying the brightness information, zoom information, and image effect information of the sensor information according to the meta-information.

The output routine may include the subroutine of checking the output device for outputting the output-mapping image and the subroutine of outputting the corresponding output-mapping image to the checked output device. For example, the output-mapping image may be output through the display unit 140 according to the output routine. The output-mapping image may be output to the external display device connected through the connection interface 130 according to the output routine.

The image processing program 151 may further include a routine for generating and outputting the external output-mapping image to the external display device connected through the connection interface 130. For example, the image processing program 151 may include the display unit output routine for outputting output-mapping image through the display unit 140 and the external display device output routine for outputting the external output-mapping image through the external display device. The external display device output routine may include a second mapping information selection routine for generating the external output-mapping image to be output to the external display device, a routine of generating the external output-mapping image based on the second mapping information, and a routing of outputting the generated external output-mapping image.

Sensing image information 153 may include the sensing image and the meta-information. The sensing image may be the image captured and provided by the image sensor 110 (RGB/RGBW Raw Image). As described above, the meta-information may include at least one shooting condition of the image sensor. A plurality of sensing image information 153 may be stored depending on the shooting.

The mapping information 166 is the information applied to the sensing image information 153 stored in the storage unit 150 to generate the output-mapping image. In the case that the output-mapping image transmission to the external display device is not supported, the mapping information 166 may include the information on only the display unit 140. In the case that the output-mapping image transmission to the external device is supported, the mapping information 166 may include the sensing image conversion information per display device. The mapping information 166 may be managed in a storage region of the control unit 160 without being stored in the storage unit 150. For example, the mapping information 166 may be included in the mapper of the control unit 160 in the form of embedded information or middleware.

The terminal 100 includes the communication unit 170 having at least one communication module for supporting communication function. The communication unit 170 may include a cellular communication module. The communication unit 170 may be configured to support receiving mapping information. The mapping information may be the criteria for converting the sensing image to the output-mapping image. The mapping information may be updated according to various simulation results and statistical results. The communication unit 170 may establish a communication channel with a server providing the mapping information. The terminal 100 may store the mapping information received by the communication unit 170 in the storage unit 150. The mapping information is configured to be stored in the control unit 160, the mapping information stored in the control unit 160 may be updated with new mapping information received by the communication unit 170.

The communication unit 170 may search for the mapping information optimized to the device ID and/or Bayer pattern provided by the external display device. For this purpose, the communication unit 170 may establish a communication with the external server providing the mapping information automatically or in response to the user request. The communication unit 170 may provide the external server with the device ID and/or Bayer pattern information under the control of the control unit 160. If the external server provides the device ID and/or the Bayer pattern information corresponding to the device, the communication unit 170 receives this information and transfers it to the control unit 160. The control unit 160 searches for and applies the mapping information optimized to the external display device connected to the connection interface 130. The communication unit 170 also may establish a communication channel for transmitting the sensing image information 153 stored in the storage unit to another electronic device under the control of the control unit 160. In the case that the terminal 100 does not support the communication function, the communication unit 170 may be omitted.

Figure 6:
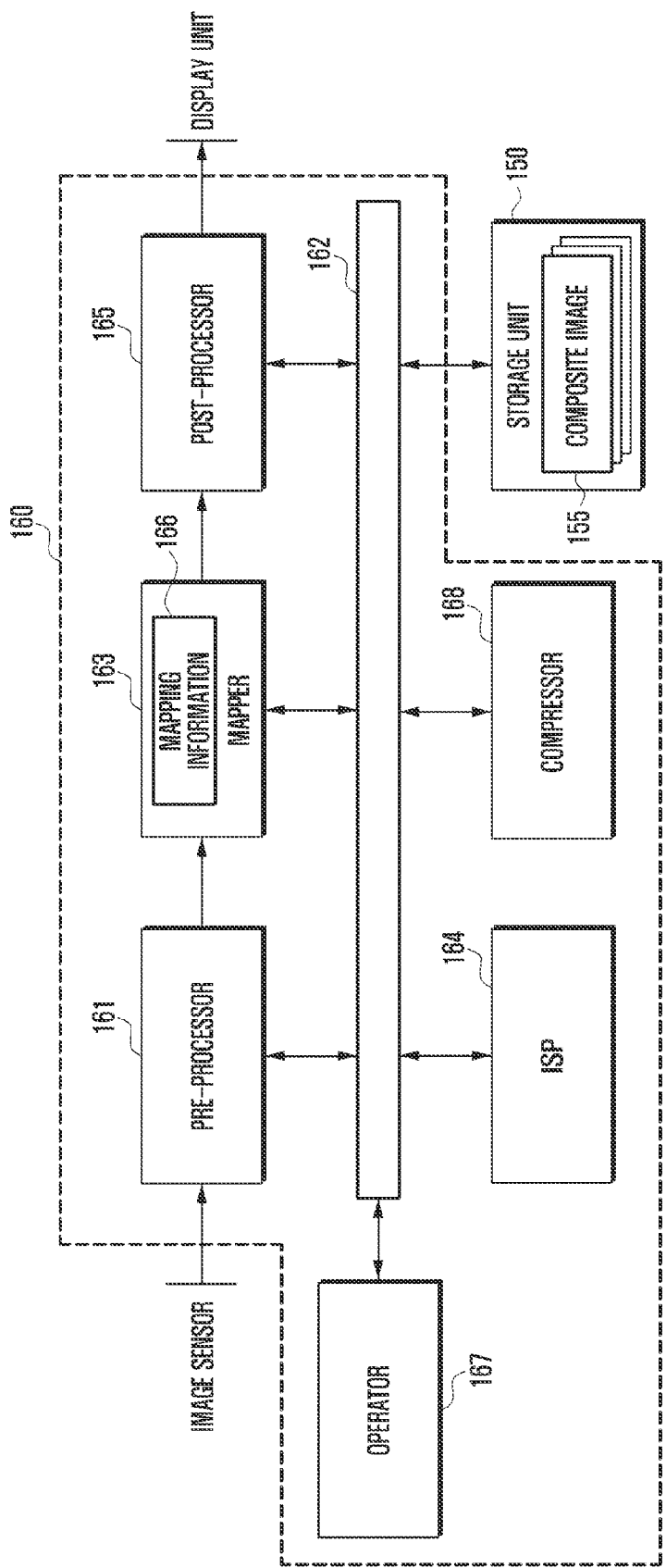
FIG. 6 is a block diagram illustrating configurations of a control unit and a storage unit of an electronic device according to another embodiment of the present disclosure.

The control unit 160 is capable of processing various data necessary for operating the functions of the terminal 100 and signals, transferring control signal, activating applications, and controlling the input unit 120 and the display unit 140. Particularly, the control unit 160 may control to store the sensing image for use in generating the output-mapping image based on the stored sensing image information. The control unit 160 may control to generate the output-mapping image based on the sensing image information. The control unit 160 also may control outputting the generated output-mapping image. For this purpose, the control unit 160 is configured as shown in FIG. 2 or 6 according to an embodiment of the present disclosure.

Figure 2:
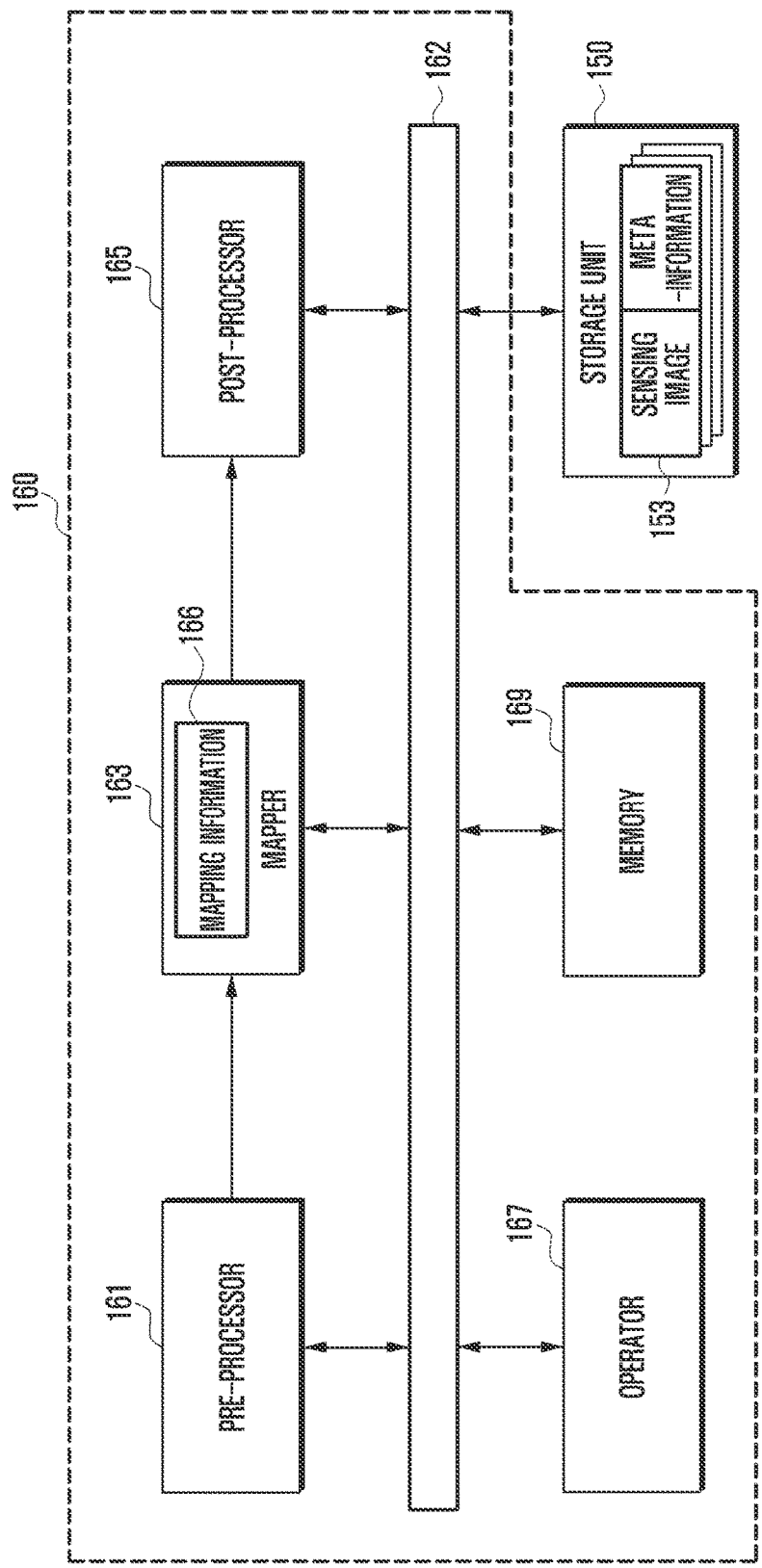
FIG. 2 is a block diagram illustrating detailed configurations of the control unit and the storage unit of FIG. 1 according to an embodiment of the present disclosure.
Figure 3:
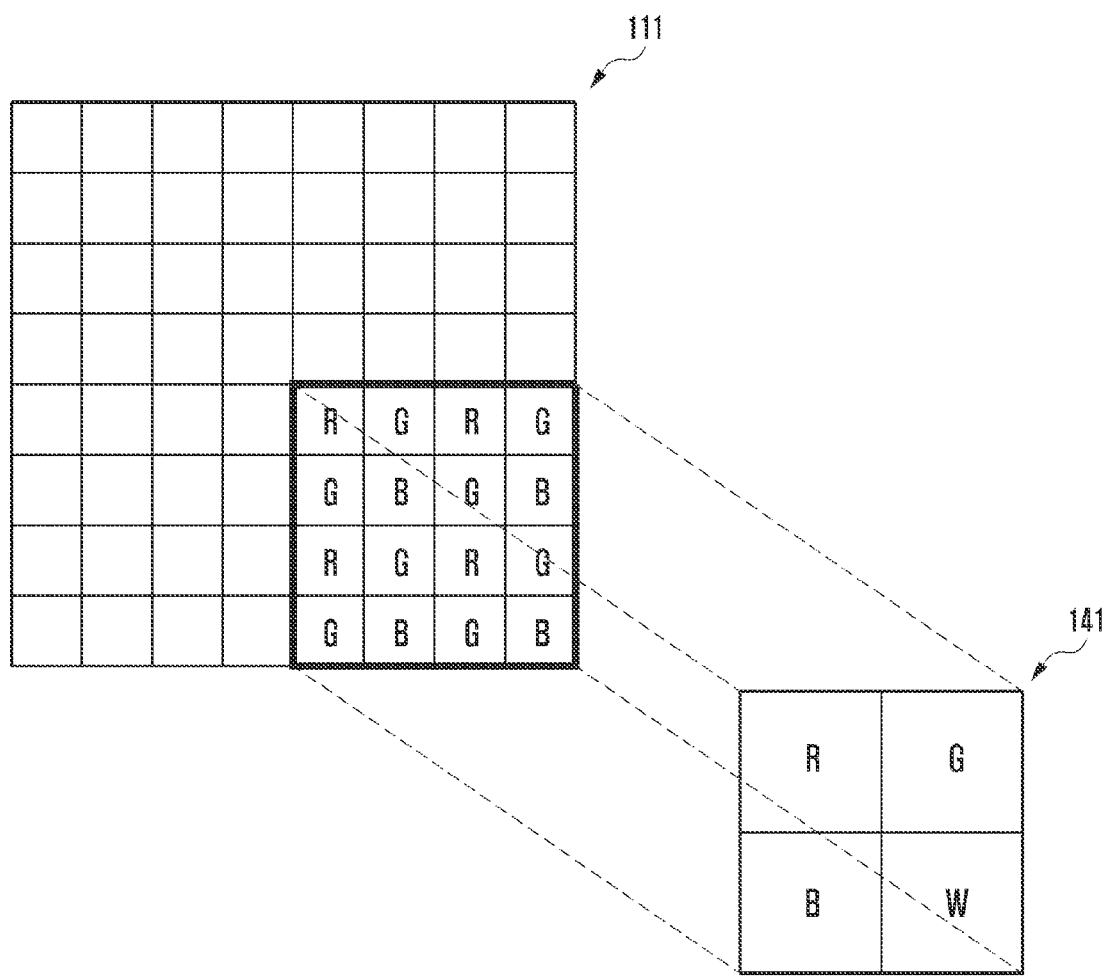
FIG. 3 is a diagram illustrating an information mapping operation according to an embodiment of the present disclosure.

FIG. 2 is a block diagram illustrating detailed configurations of a control unit and a storage unit of FIG. 1 according to an embodiment of the present disclosure. FIG. 3 is a diagram illustrating a grid for explaining image mapping operation of a mapper of the control unit according to an embodiment of the present disclosure.

Referring to FIG. 2, a control unit 160 according to an embodiment of the present disclosure includes a pre-processor 161, a mapper 163, and a post-processor 165, but is not limited thereto. The control unit 160 may further include an operator 167, a memory 169, and a bus 162.

The pre-processor 161 may control the image sensor 110. For example, the pre-processor 161 may control the image sensor according to an input signal associated with the image sensor 110 which is generated by one of the input unit 120 and the display unit 140. For example, the pre-processor 161 may control the focus adjustment of the image sensor 110. The pre-processor 161 may control the brightness adjustment of the image sensor 110. The pre-processor 161 may compensate the sensing image provided by the image sensor 110. For example, the pre-processor 161 may control Lens Shading, Defect correction, Auto Exposure (AE), Auto White Balance (AWB), and Auto Focusing (AF) operations. The pre-processor 161 may pre-process the sensing image captured by the image sensor 110, store pre-processed image in the memory 169 temporarily, and transfers the stored image to the storage unit 150 in response to an image capture request. At this time, the pre-processor 161 transfers the sensing image with the sensor Bayer pattern and the sensing image information 153 including the meta-information corresponding the shooting condition information of the image sensor to the storage unit 150. Here, the storage unit 150 may be implemented with the flash memory. Here, the term 'sensor Bayer pattern' denotes the physical pattern of the hardware of the imaging device of the image sensor as an example of the sensor pattern or the RGB sensor pattern of the photo sensors.

If the sensing image information 153 stored in the storage unit 150 is selected, the mapper 163 may change the resolution of the sensing image or perform pattern conversion according to digital zoom operation. For this purpose, the mapper 163 may converts the sensing image information 153 stored in the form of a sensor Bayer pattern in the storage unit 150 so as to be fit for the hardware characteristic of the display unit 140. For example, the mapper 163 may adjust the raw Bayer pattern of the sensing image to be fit for the Bayer pattern of the display unit in scale. At this time, the mapper 163 may adjust the Bayer pattern of the sensing image to be fit for the Bayer pattern of the display unit based on the previously stored mapping information 166 and the meta-information included in the sensing image information 153.

The mapping information 166 may be stored in the storage unit 150 and referenced afterward. The mapping information 166 also may be recorded in the mapper 163 and referenced afterward. The mapping information 166 may include the information defining how to change the sensor Bayer pattern to the Bayer pattern of the display unit. The mapping information 166 also may include the information defining how to change the sensor Bayer pattern to the Bayer pattern of the external display device.

FIG. 3 is a diagram illustrating an information mapping operation according to an embodiment of the present disclosure.

Referring to FIG. 3, the mapping information 166 is capable of mapping 4 pixels (when defining 4 sub-pixels as one pixel, 16 sub-pixels) of the sensor Bayer pattern 111 in which 4 sub-pixels are arranged like "RGGB" to one pixel of the Bayer pattern 141 of the display unit. Here, the display unit Bayer pattern 141 is arranged in "RGBW" pattern of 4 sub-pixels.

Here, the mapping information 166 exemplified in FIG. 3 may be the information defined for use in downscaling the resolution of the sensing image to ¼. Here, various methods may be defined according to the simulation result when converting the RGGB pattern corresponding to the sensor Bayer pattern 111 to the RGBW pattern corresponding to the display unit Bayer pattern. The pixel in RGB type may be defined differently depending on the physical characteristics of the hardware. For example, if the physical characteristics of the hardware are expressed with 8 bits for discriminating the color depths, each sub-pixel in RGB type may have 256 possible colors. Accordingly, the mapping information 166 may be the information for used in converting a plurality of sub-pixels colors of the sensor Bayer pattern 111 to one sub-pixel color of the display Bayer pattern 141.

For example, the mapping information 166 may define the average value of the color depths of "R" elements included in the 16 sub-pixels of the sensor Bayer pattern 111 with the color value of "R" sub-pixel of the display unit Bayer pattern 141. Likewise, the mapping information 166 may define the average value of the color depths of "B" elements included in the 16 sub-pixels of the sensor Bayer pattern 111 with the color value of "B" sub-pixel of the display unit Bayer pattern 141. Likewise, the mapping information 166 may define the average value of the color depths of "G" elements included in the 16 sub-pixels of the sensor Bayer pattern 111 with the color value of "G" sub-pixel of the display unit Bayer pattern 141. Also, the mapping information 166 may define the highest values of the color depths of "R," "B," and "G" elements included in the 16 sub-pixels of the sensor Bayer pattern 111 with the color values of "R," "B," and "G" sub-pixels of the display unit Bayer pattern 141.

The mapping information 166 may define a non-linear pattern conversion. For example, the mapping information 166 may define a rule of converting the pattern differently according to the characteristics by region of the captured image. For example, the mapping information 166 may define the pattern conversion at a boundary area included in the sensing image as the first type pattern conversion and the pattern conversion at the non-boundary region having no color change as the second type pattern conversion.

The first type pattern conversion may be a method for expressing the boundary region more clearly, e.g. applying high weight to the high value of color depth. The second type pattern conversion may be a method for expressing the color brightness at the non-boundary region more distinctly by applying relatively high "white" weight.

As described above, the mapping information 166 of the present disclosure may defined at least one of various types in the procedure of converting the sensor Bayer pattern 111 to the display Bayer pattern 141. Accordingly, the various embodiments of the present disclosure are not restricted to the above-described mapping information definition method. For example, since it may be changed variously depending on the hardware characteristics of the image sensor 110 and the display unit 140, the mapping information 166 may be defined diversely depending on the characteristics of the electronic device to which the present disclosure is applied and the simulation and statistical results.

Returning to FIG. 2, the post-processor 165 may process the pattern-adjusted image from the mapper 163 to generate the output-mapping image fit for the display unit 140. For example, the post-processor 165 may update information on the quality of the image to be output through the display unit 140 finally. For example, the post-processor 165 may perform color image processing and display processing. The color image processing may include noise reduction and color correction processes. The display processing may include flip/rotate process, smooth/sharpness process, and crop process.

The operator 167 controls the operations of the pre-processor 161, the mapper 163, and the post-processor 165 using various routines provided by the OS. In this procedure, the operator 167 may reference the schedule information of the various routines necessary for operating the image sensor. The operator 167 may activate the image sensor 110 according to the input signal input signal generated by the input unit 120 and the display unit 140. The operator 167 may control such that the sensing image acquired by the image sensor 110 is provided to the pre-processor 161. The operator 167 may control the image sensor 110 via the pre-processor 161 according to the schedule information.

According to an embodiment of the present disclosure, the operator 167 may control such that the sensing image provided by the image sensor 110 is stored along with the shooting condition information of the image sensor 110 as the sensing image information 153 in the storage unit 150 under the control of the pre-processor 161. The operator 167 also may control such that the sensing image is converted to the output-mapping information based on the mapping information 166 and the meta-information under the control of the mapper 163 in response to a request for outputting the sensing image information 153 stored in the storage unit 150. In the procedure, the operator 167 may control such that the sensor Bayer pattern is converted to the display Bayer pattern according to the information recorded in the mapping information 166. The operator 167 also may control such that the pattern-converted image processed with brightness adjustment, digital zoom-in/out adjustment, image effect adjustment, and the like.

According to an embodiment of the present disclosure, the memory 169 is the reason for loading data necessary for control operation of the controller 160. Here, memory 169 may be understood as a component separated from the storage unit 150 or a part of the storage unit 150. For example, if the storage unit 150 is implemented in the flash memory type and provided in the form of a hard disc, the memory 169 may be provided in the form of a Random Access Memory (RAM). The memory 169 also provides the work space for loading the sensing image along with the meta-information as sensing image information 153 in the procedure of storing and outputting sensing image according to an embodiment of the present disclosure. The memory 169 also may provide the work space for converting the sensing image stored in the storage unit 150 to the output-mapping image based on the meta-information and the mapping information 166.

Although the memory 169 may be provided in the type of RAM or Cache memory in view of accessibility and speed, the present disclosure is not limited thereto. The memory 169 stores the sensing image having the sensor Bayer pattern and may provide a region for storing the output-mapping image converted to have the display unit Bayer pattern.

According to an embodiment of the present disclosure, the bus 162 may be a physical and/or logical component for exchanging data and control signal among the above-described components. In the present disclosure, the bus 164 carries the data in the procedure of storing the sensing image captured by the image sensor 110 in the storage unit 150 via the memory 169. The bus 164 also may carry the control signal generated by the mapper 163 for converting the sensing image stored in the storage unit 130 to the output-mapping image based on the mapping information 166 and the meta-information. The bus 164 also may transfer the data from the storage unit 150 to the memory 169, mapper 163, and/or post-processor 165. The bus 162 also may carry the output-mapping image generated through post-processing to the display unit 140.

As described above, the electronic device of the present disclosure is capable of storing the sensor Bayer-patterned sensing image captured by the image sensor 110 in the storage unit 150 along with the meta-information. The electronic device is capable of converting the sensing image to the output-mapping image based on the mapping information and the meta-information, the mapping information being predefined to convert the sensor Bayer pattern to the display Bayer pattern in outputting the sensing image stored in the storage unit 150 to the display unit 140. The present disclosure is capable of storing the sensing image and displaying the search image without encoding/decoding process onto the sensing image.

Figure 4:
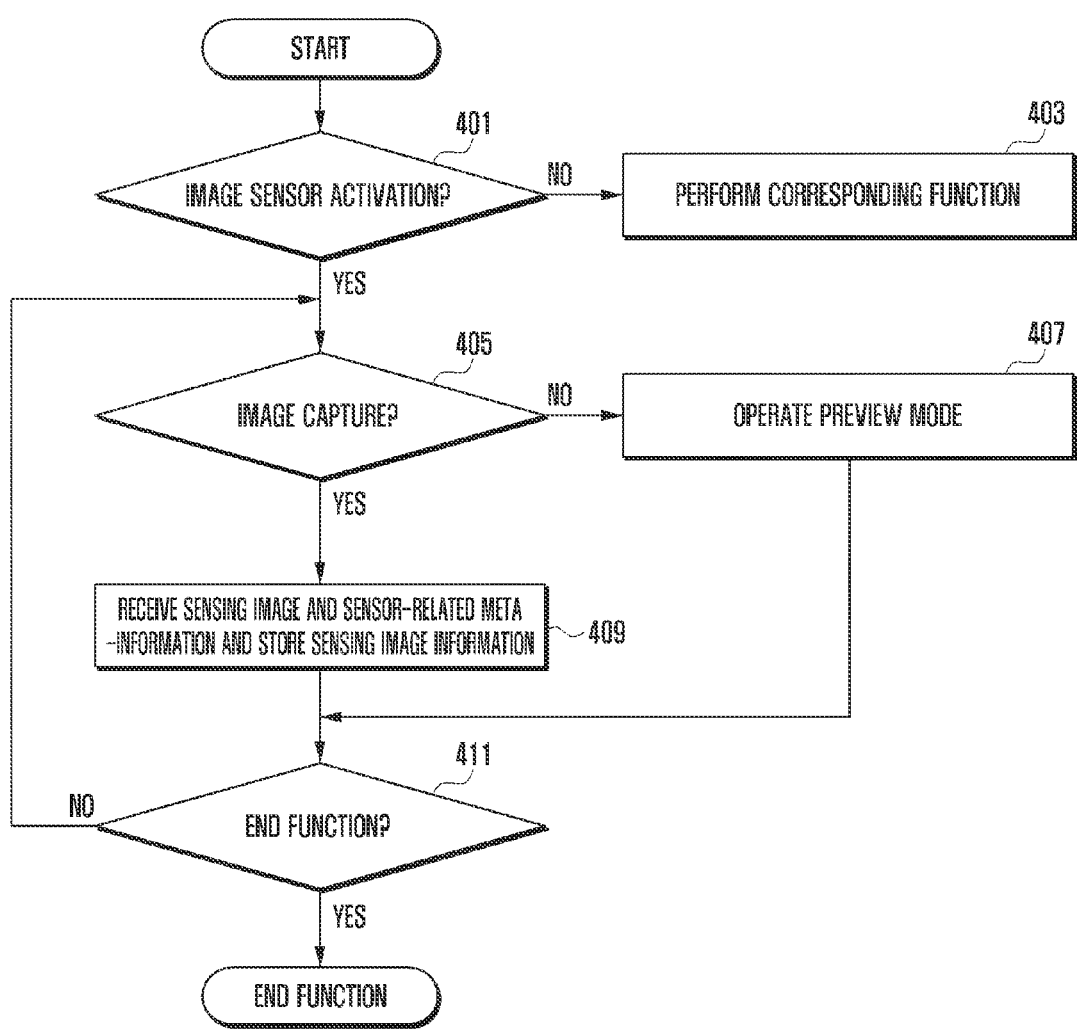
FIG. 4 is a flowchart illustrating a procedure of a sensing image in an image processing method of an electronic device according to an embodiment of the present disclosure.

FIG. 4 is a flowchart illustrating the procedure of the sensing image in the image processing method of the electronic device according to an embodiment of the present disclosure.

Referring to FIG. 4, the control unit 160 of the electronic device, i.e. terminal 100, monitors to detect a scheduled event or an input event made through the input unit 120 or the input function-enabled display unit 140. If an event is detected, the control unit 160 determines whether the event is of triggering activation of the image sensor 110 at operation 401. At this time, if the event does not relate to the image sensor 110, the control unit 160 performs the function corresponding to the event at operation 403. For example, the control unit 160 may execute a function according to the type and characteristics of the event such as communication function, specific application function, and the like.

If the event is of triggering the image sensor 110, the control unit 160 powers on the image sensor 110. The control unit 160 initializes the image sensor 110. Next, the control unit 160 determines whether an input event for capturing and image is detected in the image shooting mode at operation 405. If no input event for image capture is detected, the control unit 160 controls the terminal to operate in the preview mode at operation 407.

If the input event for image capture, e.g. shutter press signal, is detected, the control unit 160 controls to capture the sensing image and collect meta-information associated with the sensor at operation 409. If the shutter press signal is detected, the image sensor captures the sensing image of a subject and provides the control unit 160 with the raw image. The control unit 160 may collect the shooting condition information of the image sensor as the meta-information at the time when the corresponding sensing image is captured. The control unit 160 also controls to store the sensing image and the sensing image information including the meta-information in the storage unit 150.

Next, the control unit 160 determines whether an event for terminating the function is detected at operation 411. If the function termination event is detected, the control unit 160 ends the function related to the image sensor 110. At this time, the control unit 160 power of the image sensor 110 and controls the display unit to display a predetermined screen, e.g. standby screen. Otherwise if no function termination event is detected, the control unit 160 returns the procedure to operation 405.

Figure 5:
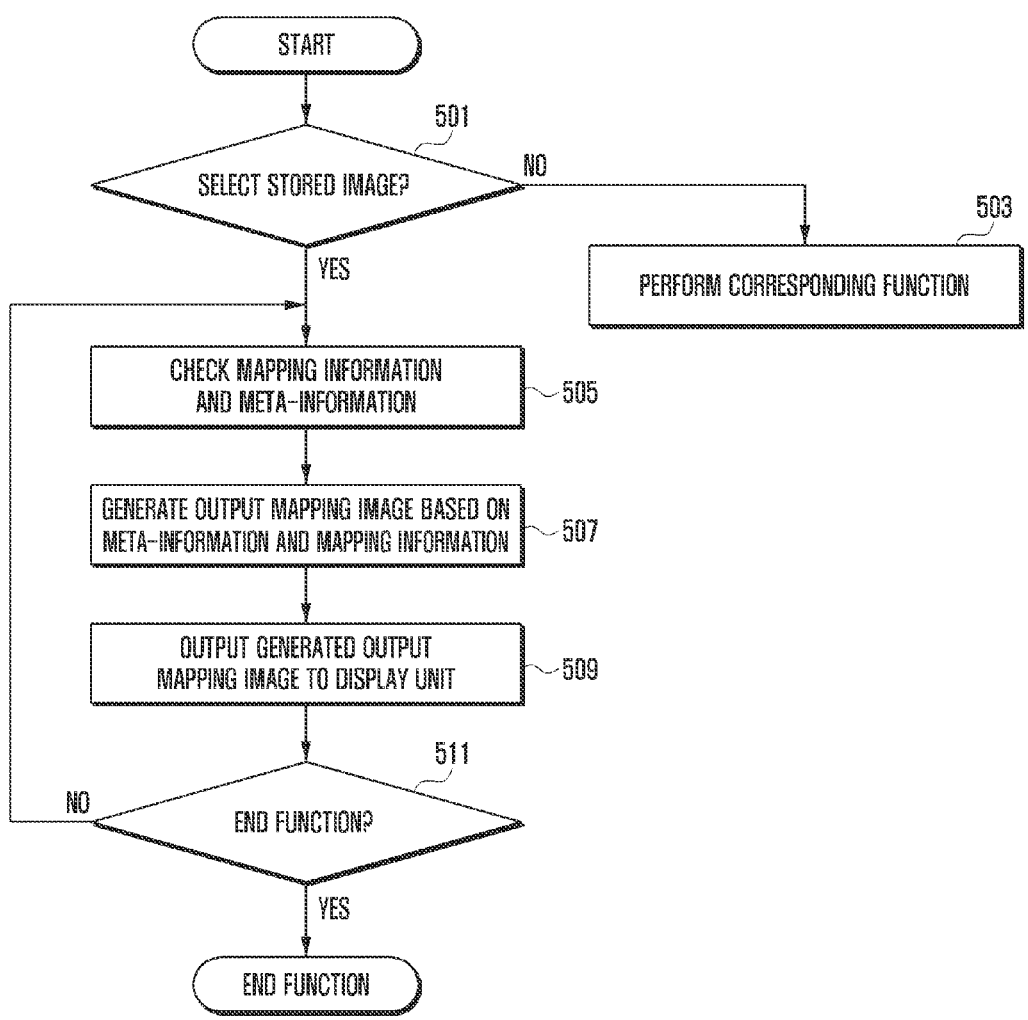
FIG. 5 is a flowchart illustrating a sensing image output procedure of an image processing method of an electronic device according to an embodiment of the present disclosure.

FIG. 5 is a flowchart illustrating the sensing image output procedure of the image processing method of the electronic device according to an embodiment of the present disclosure.

Referring to FIG. 5, the control unit 160 monitors to detect an event and, if an event is detected, determines whether the event is a stored image selection event at operation 501. For example, the control unit 160 may determines whether an event for selecting the sensing image information 153 stored in the storage unit 150. The event for selecting the sensing image information 153 stored in the storage unit 150 may occur automatically when a specific image is shot or stored. A selection input of searching for a plurality of sensing image information stored in the storage unit 150 may be made by means of the input unit 120 or the input function-enabled display unit 140. If the event is not the stored image selection event, the control unit performs a function corresponding to the event at operation 503. For example, if the event is a specific file playback request event, the control unit 160 controls to play the corresponding file.

If the event is the stored image selection event, the control unit 160 checks the mapping information and meta-information at operation 505. For this purpose, the control unit 160 may select the mapping information predefined to output the sensing image to the display unit 140. The control unit 160 may check the meta-information included in the sensing image information 153. The control unit 160 may generate the output-mapping image based on the meta-information and the mapping information. For example, the control unit 160 may apply the scale of the sensing image which is fit for the display unit Bayer pattern based on the mapping information. The control unit 160 may apply the image effect to the sensing image or perform image compensation based on the meta-information.

If the output-mapping image is generated, the control unit 160 controls to output the generated output-mapping image to the display unit 140 at operation 509. In the procedure, the control unit 160 may further performing the post-processing on the output-mapping image generated based on the meta-information and the mapping information.

Next, the control unit 160 determines whether a function termination event is detected at operation 511. If the function termination event is detected, the control unit 160 ends the stored image search function and controls switching to the function scheduled according to the schedule information. If an input signal for turn-off of the terminal 100, the control unit 160 controls the terminal 100 to power off Otherwise if no function termination even is detected, the control unit 160 returns the procedure to operation 505. If a new stored image selection event is detected, the control unit 160 controls to collect meta-information of the selected image and the mapping information for applying the display unit Bayer pattern. The control unit 160 generates new output-mapping image based on the collected information and controls to display the output mapping image.

Figure 7:
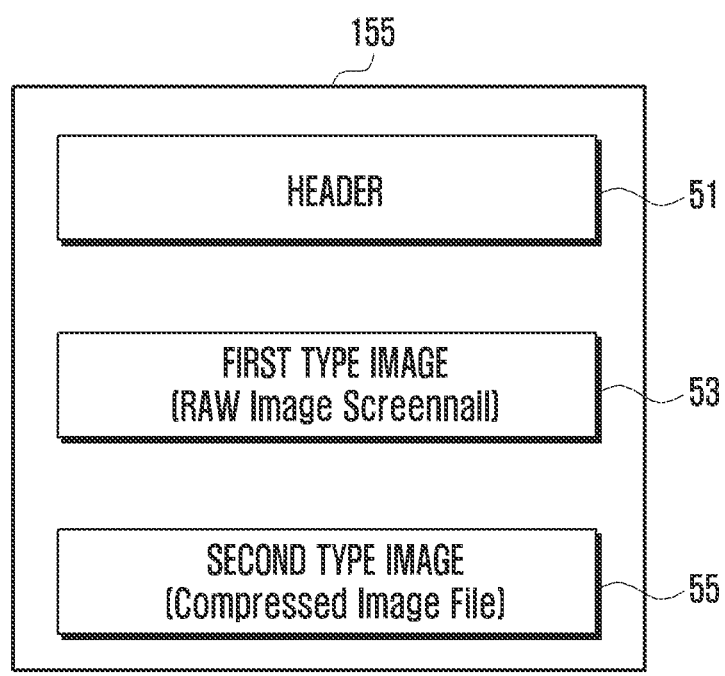
FIG. 7 is a block diagram illustrating a detailed data structure of a composite image according to an embodiment of the present disclosure.

FIG. 6 is a block diagram illustrating a part of the configuration of a terminal, particularly a configuration of a control unit according to an embodiment of the present disclosure. FIG. 7 is a block diagram illustrating a detailed data structure of a composite image stored in a storage unit of FIG. 6 according to an embodiment of the present disclosure.

Referring to FIG. 6, a control unit 160 according to an embodiment of the present disclosure includes a control unit 160, a pre-processor 161, a mapper 163, a post-processor 165, an operator 167, an ISP 164, and a compressor 168, but is not limited thereto.

The above-configured control unit 160 is capable of processing the sensing image captured by the image sensor 110 in two ways. As shown in FIG. 7, the composite image 155 processed by the control unit 160 and stored in the storage unit 150 is comprised of a header 51, a first type image 53, and a second type image 55.

According to an embodiment of the present disclosure, the header 51 may include the first property information related to the first type image 53 and the second property information defining the data property of the second type image 55. For example, the first property information contained in the header 51 may include the type of the mapping information applied for generating the first type image 53, resolution of the first type image 53, and target Bayer pattern information of the first type image. The second property information contained in the header 51 may be the information defining the data property of the second type image 55. For example, the second property information may include compression rate of the second type image 55, data structure of the structure of the second type image 55, and extension.

According to an embodiment of the present disclosure, the first type image 53 may be the image generated as a result of the operation of the pre-processor 161 and the mapper 163. For example, the first type image 53 may be the output-mapping image acquired by processing the sensing image of the sensor Bayer pattern to be fit for the display unit Bayer pattern based on the predefined mapping information. The first type image 53 may be the image generated to be output through the display unit 140 having the resolution lower than that of the sensing image. For example, when the sensing image has 13 MP resolution, the first type image 53 may be processed to have with 4 MP resolution fit for the display unit 140.

According to an embodiment of the present disclosure, the second type image 55 may be the data generated as a result of the operations of the pre-processor 161, the ISP 164, and the compressor 168. The second type image 55 may be the image acquired by extracting the optical properties from the image provided by the image sensor 110 and encoding and compressing the image based on the extracted optical properties. For example, if the image sensor 110 provides RGB type image, the second type image 55 may be an YCbCr type image which is encoded by an encoder of the terminal 100 and compressed so as to be stored as compressed data.

According to an embodiment of the present disclosure, the pre-processor 161 may support the above-described preprocessing function. The preprocessor 161 depicted in FIG. 6 may transfer the sensing image received from the image sensor 110 to the mapper 163 and the ISP 164 simultaneously.

According to an embodiment of the present disclosure, the mapper 163 generates the output-mapping image corresponding to the first type image 53 based on the mapping information 166 which defines the conversion of the sensing image provided by the pre-processor 161 to be fit for the display Bayer pattern. The output-mapping image generated by the mapper 163 may be the image generated based on the sensing image captured by the image sensor 110. If the output-mapping image is generated, the mapper 163 may store the corresponding image as the first type image 53 in the storage unit 150.

According to an embodiment of the present disclosure, the ISP 164 performs various image processing operations on the sensing image provided by the image sensor 110. The ISP 164 may perform various image processing operations including black level adjustment, noise reduction, white balance, color filter array interpolation, color correction, and gamma correction. Particularly, the ISP 164 may convert RGB format to YUV format. The ISP 164 may provide the sensing image converted in image format to the compressor 168.

According to an embodiment of the present disclosure, the compressor 168 may compresses the format-converted image provided by the ISP 164 suing a predefined algorithm. For example, the compressor 168 compresses the format-converted image to generate a format-converted compressed image such as JPEG and transfers the result image as the second type image 55 to the storage unit 150.

According to an embodiment of the present disclosure, the operator 167 may generate the composite image 155 by combining the first type image 53 corresponding to the output-mapping image and the second type image 55 corresponding to the format-converted compressed image. At this time, the operator 167 may include the first property information of the first type image 53 and the second property information of the second type image 55 in the header 51. The operator 167 may control such that the composite image comprised of the header 51, the first type image 53, and the second type image 55 is stored at a predetermined region of the storage unit 150.

According to an embodiment of the present disclosure, the memory 169 may provide a data loading space necessary for data write/read of the above-described components and signal processing. For example, the memory 169 may store the data pre-processed by the pre-processor 161 temporarily before transfer to the mapper 163 and the ISP 164. The memory 169 may store the first and second type images 53 and 55 and the header 51 generated by the operator 167 temporarily. The memory 169 may store the first type image 53 temporarily in the process of outputting the composite image 155 from the storage unit 150. The memory 169 also may store a part of the composite image 155 temporarily in the process of transmitting the composite image 155 to another terminal.

If an event for selecting the composite image 155 stored in the storage unit 150 occurs, the control unit 160 may retrieve only the first type image 53 included in the composite image 155. The control unit 160 may control the post-processor 165 to perform post-processing on the first type image 53. The control unit 160 also may control such that the post-processed first type image 53 is displayed on the display unit 140. The first type image 53 may be the image generated by mapping the sensor Bayer pattern to the display unit Bayer pattern based on the mapping information collected at its creation. Accordingly, the control unit 160 may control such that the first type image 53 is displayed on the display unit 140 without applying any extra mapping information.

It may be requested to transmit the composite image 155 to another terminal. In this case, the control unit 160 may control to delete the first type image 53 and the first property information corresponding thereto depending on the property of the other terminal and transmit the corrected composite image to the other terminal. For example, if the property of the display device of the other terminal differs from that of the display device of the terminal 100, the first type image 53 may not be processed correctly at the other terminal. In this case, the control unit 160 may transmit the composite image from which the first type image 53 has been deleted.

If the display device properties of the two terminals match, the control unit 160 may control such that the composite image 155 is transmitted immediately. For example, it is requested to transmit the composite image 155 to another terminal identical with the terminal 100 in model, the control unit 160 may control such that the composite image 155 is transmitted without any correction. For this purpose, the control unit 160 may receive the information on the property of the display device of the other terminal and check whether the display device properties of the two terminals match each other. The control unit 160 also may receive the model information of the other terminal to determine whether the models of the two terminals match each other.

The terminal 100 may have the mapping information for supporting the display device of the other terminal. In this case, the control unit 160 may retrieve the mapping information corresponding to the display device property of the other terminal. The control unit 160 may convert the first type image 53 to a mapping image for transmission based on the mapping information corresponding to the other terminal. The control unit 160 also may control such that the composite image 155 in which the first type image 53 has been replaced by the mapping image for transmission is transmitted to the other terminal.

Figure 8:
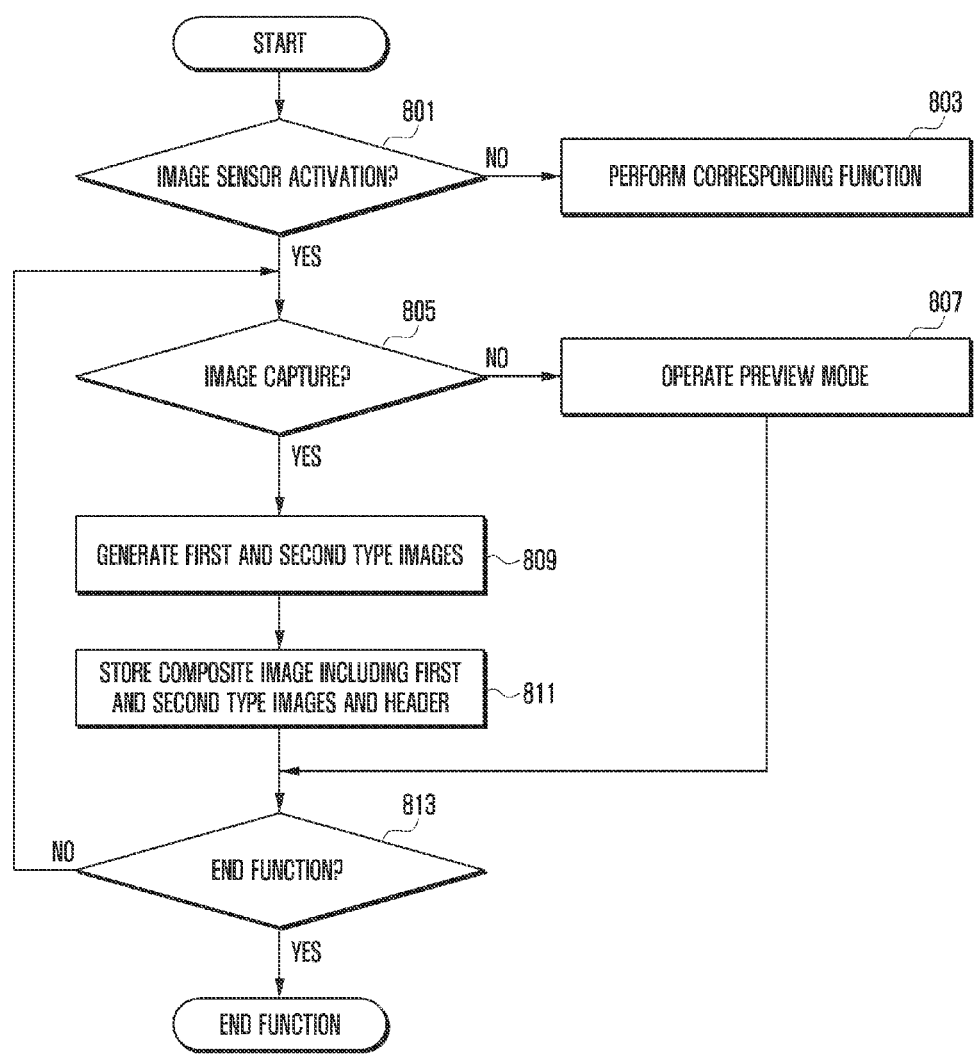
FIG. 8 is a flowchart illustrating a procedure of storing a composite image in an image processing method of an electronic device according to an embodiment of the present disclosure.

FIG. 8 is a flowchart illustrating a procedure of storing the composite image in the image processing method of the electronic device according to an embodiment of the present disclosure.

Referring to FIG. 8, the control unit 160 monitors to detect an event and, if an event is detected, determines whether the event is a request for activation of the image sensor 110 at operation 801. If the event is not the request for activation of the image sensor 110, the control unit 160 performs a function corresponding to the detected event at operation 803. If the event is the request for activation of the image sensor 110, the control unit 160 powers on and initializes the image sensor 110.

The control unit 160 continues monitoring after the initialization of the image sensor 110 and, if another event is detected, determines whether the event is a request for image capture at operation 805. If the event is not the image capture event, the control unit 160 controls the image sensor 110 to operate as predetermined, e.g. in preview mode, at operation 807. The control unit 160 may control such that the terminal operates in the preview mode while waiting for the image capture event.

If the image capture event is detected at operation 805, the control unit 160 generates the first type image 53 and the second type image 55 at operation 809. At this time, the control unit 160 may generate the first type image 53 from the sensing image provided by the image sensor 110 based on the predefined mapping information. For example, the first type image 53 may be the image acquired by adjusting RGB type sensing image in scale. The second type image 55 may be the image acquired by processing the sensing image provided by the image sensor 110 and encoding and compressing the processed image. For example, if the sensing image is RGB type, the second type image 55 may be YUV type.

Next, the control unit 160 controls such that the first and second type images 53 and 55 are combined along with the header 51 so as to be stored as the composite image 155 at operation 811. Here, the header 51 may include the Bayer pattern information of the first type image 53 and the encoding and compression information of the second type image 55. The control unit 160 may detect the input signal for terminating the function at operation 813. If no input signal for terminating the function is detected, the control unit 160 returns the procedure to operation 805.

Figure 9:
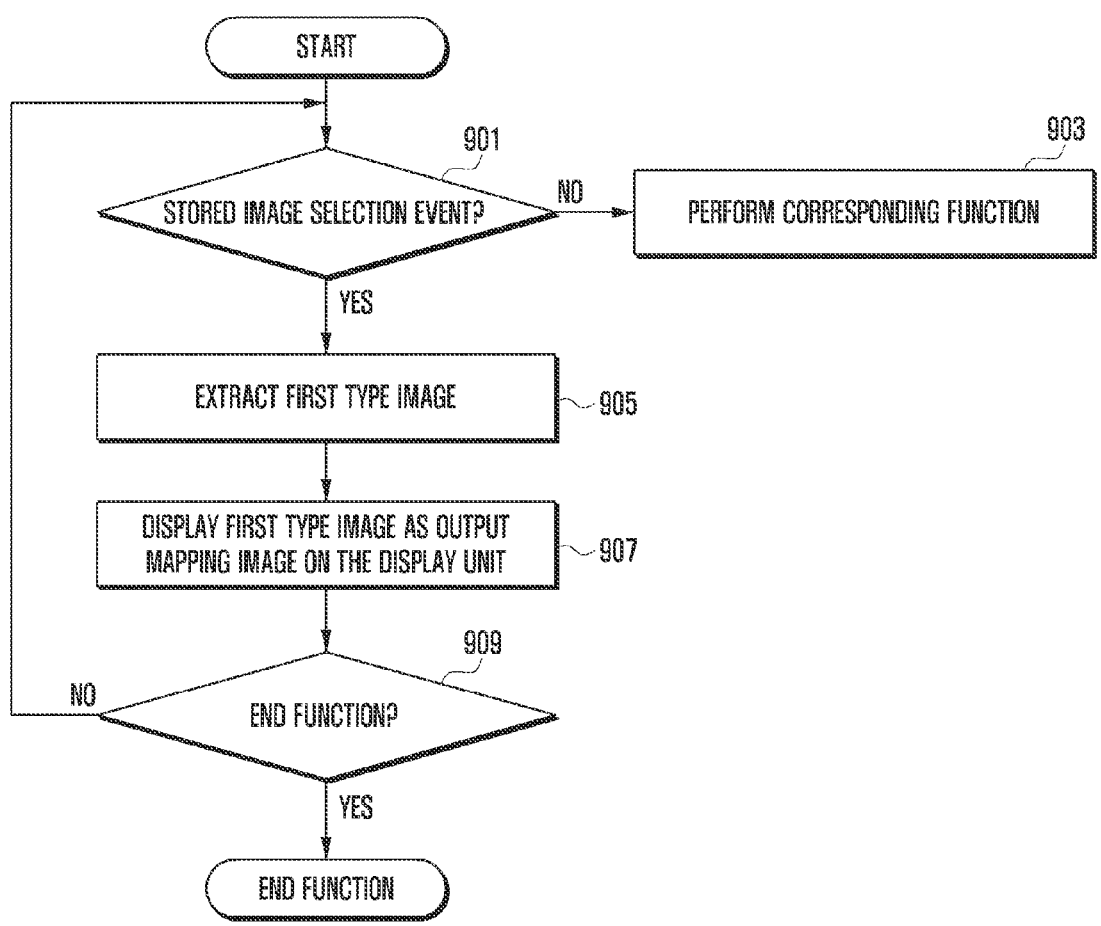
FIG. 9 is a flowchart illustrating a composite image output procedure of an image processing method of an electronic device according to an embodiment of the present disclosure.

FIG. 9 is a flowchart illustrating a composite image output procedure of the image processing method of the electronic device according to an embodiment of the present disclosure.

Referring to FIG. 9, the control unit 160 monitors to detect an input event and, if an input event is detected, determines whether the input event is a request for selecting a stored image at operation 901. If the input event is not the stored image selection request, the control unit 160 performs a function corresponding to the detected event at operation 903.

If the input event is the request for selecting the stored image at operation 901, the control unit 160 retrieves the first type image 53 to be output to the display unit 140 at operation 905. For this purpose, the control unit 160 may check the composite image 155 stored in the storage image 150, the composite image designated by the input event. The control unit 160 also may control such that the first type image 53 of the composite image 155 is stored in the memory 167 temporarily.

The control unit 160 may control such that the first type image 53 stored in the memory 169 is displayed on the display unit 140 as the output-mapping image. At this time, the control unit 160 may control such that the post-processing is performed on the first type image 53 optionally depending on the scheduled information. Next, the control unit 160 continues monitoring to detect an input event for terminating the function at operation 909. If the function termination event is detected, the control unit 160 controls display unit 140 to display a screen according to the scheduled information instead of the screen display for selecting stored image. The control unit 160 also may control such that the terminal 100 enters the sleep mode according to the input event property.

Figure 10:
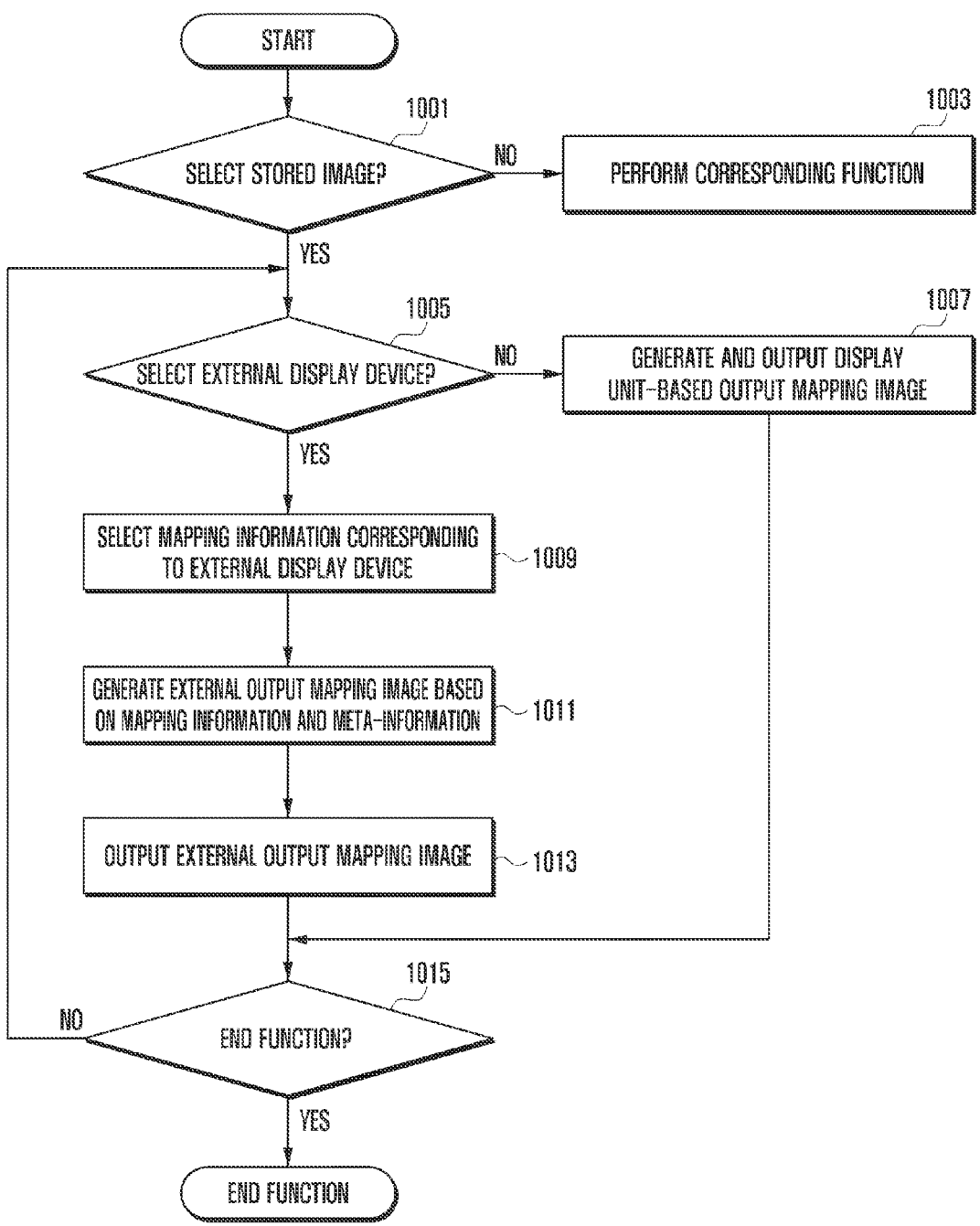
FIG. 10 is a flowchart illustrating an electronic device control method according to an embodiment of the present disclosure.

FIG. 10 is a flowchart illustrating the electronic device control method according to an embodiment of the present disclosure. Particularly, the following description is directed to the procedure of storing and outputting the sensing image to an external display device.

Referring to FIG. 10, the control unit 160 monitors to detect an input event and, if an input event is detected, determines whether the input event is a request for selecting a stored image at operation 1001. If the input event is not the stored image selection request, the control unit 160 performs a function corresponding to the detected event at operation 1003. For example, the control unit 160 may execute a picture edit function, a background change function, a file playback function, or a communication function.

If the input event is the request for selecting the stored image at operation 1001, the control unit 160 continues monitoring to detect an input event and, if an input event is detected, determines whether the input event is a request for selecting an external display device at operation 1005. For this purpose, the control unit 160 may check the connection interface 130 to determine whether an external display device is connected. When the stored image selection request is detected, the control unit 160 may control the display unit 140 to display an external display device list. If no external display device selection event is detected, the control unit 160 may control the display unit 140 to display the output mapping image at operation 1007.

In the case that the control unit 160 is configured as shown in FIG. 2, it may generates the output mapping image by processing the sensing image stored in the storage unit 150 based on the mapping information and meta-information. The control unit 160 may control the display unit 140 to display the output-mapping image. In the case that the control unit 160 is configured as shown in FIG. 6, it may extract the first type image 53 from the composite image 155 stored in the storage unit 150. The control unit 160 may control the display unit 140 to display the extracted first type image 53.

According to an embodiment of the present disclosure, if an external display selection event is detected or if it is configured that an external display device connected to the connection interface 130 selected as default, the control unit 160 may select the mapping information corresponding to the external display device at operation 1009. For this purpose, the control unit 160 may collect, when the external display device is connected or the stored image output is requested, at least one of the property information and model information of the external display device. The control unit 160 may extract the mapping information corresponding to the external display device. For this purpose, the mapping information may be stored by external device identity information or by external display device model. Here, the mapping information may include the mapping algorithm for generating the external output-mapping image optimized to the hardware property of the display unit 140 or the external display device from the sensing image.

Next, the control unit 160 generates the external output-mapping image based on the extracted mapping information and the meta-information at operation 1011. Here, the meta-information may include the shooting condition information collected in the procedure of storing the sensing image. If the external output-mapping image is generated, the control unit 160 controls such that the external output-mapping image is output through the connection interface 130 at operation 1013. The control unit 160 monitors to detect and input event and, if an input event is detected, determines whether the input event is a request for terminating the function at operation 1015. If no input event is detected, the control unit 160 returns the procedure to operation 1005.

According to an embodiment, the above-described electronic device control method is directed to the case where the captured sensing image is stored in the storage unit 150. In the case that the composite image 155 is stored in the storage unit 150, the control unit 160 may control such that a corrected composite image from which the first type image 53 is deleted is output to the external display device as described with reference to FIG. 6. The control unit 160 also may convert the first type image 53 to a format of the mapping image for transmission to be fit for the external display device. The control unit 160 also may control such that the composite image including the mapping information for transmission is output to the external display device.

As described above, the method and electronic device for processing image according to an embodiment of the present disclosure is capable of storing the sensing image acquired by the image sensor 110 through a simplified processing procedure. The method and electronic device for processing image according to an embodiment of the present disclosure is also capable of outputting the sensing image stored in the storage unit 150 through the simplified processing procedure to the display unit 140 or the external display device. The image processing method and apparatus of the present disclosure is capable of simplifying the hardware device for processing the sensing image and securing physical space for other purpose. Also, the image processing method and apparatus of the present disclosure is capable of reducing the sensing image processing load, resulting in improvement of operation efficiency of the electronic device.

The Bayer pattern of the image acquired by the image sensor 110 of the present disclosure is not limited to the above-described RGB/RGBW. For example, the Bayer pattern may be determined among various types depending on the design purpose and type.

The image sensor 110 process the subject image by itself to generate the output-mapping image to the control unit 160. In order to achieve this, the image sensor 110 may include an image processing module for processing images. For example, the above described pre-processor 161, mapper 163, and post-processor 165 of the control unit 160 may be included as components of the image sensor. In this case, the image sensor 110 should be understood as an integrated module including the aforementioned components. The mapper 163 of the above-configured image sensor 110 may be implemented in an embedded type or a middleware type. The image sensor 110 may generate the output-mapping image based on the corresponding mapping information and transmit the output-mapping image to the control unit 160. At this time, the control unit 160 may control such that the output-mapping image provided by the image sensor 110 is output to the display unit 140 without extra process.

According to an embodiment of the present disclosure, the terminal 100 may further include various function modules. For example, the terminal 100 may further include an interface for data transmission in wired or wireless communication mode, an Internet communication module for supporting Internet access, and other components. Although it is difficult to enumerate all of the functional components that may be converged in various manners according to the trend of digital convergence, the terminal may be implemented with or without at least one of aforementioned functional components and their equivalent devices. In the present disclosure, the terminal 100 may be implemented without certain components or with any replaced components. This will easily be understood to those skilled in the art.

According to an embodiment of the present disclosure, examples of the terminal 100 may include all the types of cellular communication terminals operating on various communication protocols, Portable Multimedia Player (PMP), digital broadcast player, Personal Digital Assistant (PDA), music player (e.g. MP3 player), portable game console, smartphone, laptop computer, and handheld computer.

As described above, the electronic device and method for operating the electronic device according to the present disclosure is advantageous in processing the collected images so as to store and output the images more efficiently.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an image sensor configured to capture an image;
   an input unit configured to received a capture input for capturing the image;
   a control unit configured to:
     generate a first image having image data with a format identical to a sensor pattern of the image sensor in response to the capture input, and
     generate a second image having image data with a different format from that of the first image according to the capture input; and
   storage configured to store an image file including a header containing property information on the first and second images, the first image, and the second image.

2. The electronic device of claim 1, wherein the control unit is further configured to control, when a composite image selection event is detected, the display unit to display the first image.

3. The electronic device of claim 2, wherein the control unit is further configured to control down-scaling the image to generate the first image.

4. The electronic device of claim 1, further comprising:
   a connection interface configured to connect to an external display device,
   wherein the control unit is further configured to check device property information of the external display device.

5. The electronic device of claim 4, wherein the control unit is further configured to:
   control transmission, when the external display device differs from the display unit in device property, of a composite image from which the first image is deleted to the external display device, and
   control transmission, when the external display device is identical with the display unit in device property, of the composite image.

6. The electronic device of claim 4, wherein the control unit is further configured to:
   control converting, when the external display device differs from the display unit in device property, the first image to a new image based on the mapping information defined for conversion to bayer pattern property of the external device,
   control replacing the first image of a composite image with the converted image, and
   control transmitting the composite image to the external display device.

7. The electronic device of claim 1, wherein the control unit is further configured to:
   control a first type pattern conversion by applying high weight to a high value of a color depth, and
   control a second type pattern conversion by expressing a color brightness at a non-boundary region by distinctly applying a relatively high "white" weight.

8. A method for operating an electronic device, the method comprising:
   receiving a capture input for capturing an image using an image sensor;
   generating a first image having image data with a format identical to a sensor pattern of the image sensor in response to the capture input;
   generating a second image having image data with a different format from that of the first image according to the capture input; and
   storing an image file including a header containing property information on the first and second images, the first image, and the second image.

9. The method of claim 8, further comprising:
   when a composite image selection event is detected, displaying the first image on a display unit.

10. The method of claim 9, further comprising:
    down-scaling the image to generate the first image.

11. The method of claim 8, further comprising:
    checking device property information of an external display device.

12. The method of claim 11, further comprising:
    controlling transmission, when the external display device differs from an display unit in device property, of a composite image from which the first image is deleted to the external display device; and controlling transmission, when the external display device is identical with the display unit in device property, of the composite image.

13. The method of claim 11, further comprising:

converting, when the external display device differs from a display unit in device property, the first image to a new image based on the mapping information defined for conversion to bayer pattern property of the external device;

replacing the first image of a composite image with the converted image; and transmitting the composite image to the external display device.

14. The method of claim 8, further comprising:

controlling a first type pattern conversion by applying high weight to a high value of a color depth; and controlling a second type pattern conversion by expressing a color brightness at a non-boundary region by distinctly applying a relatively high "white" weight.

\* \* \* \* \*